H. C. WAITE.
TRACTOR.
APPLICATION FILED JAN. 9, 1915.
1,191,858.
Patented July 18, 1916.
3 SHEETS—SHEET 1.
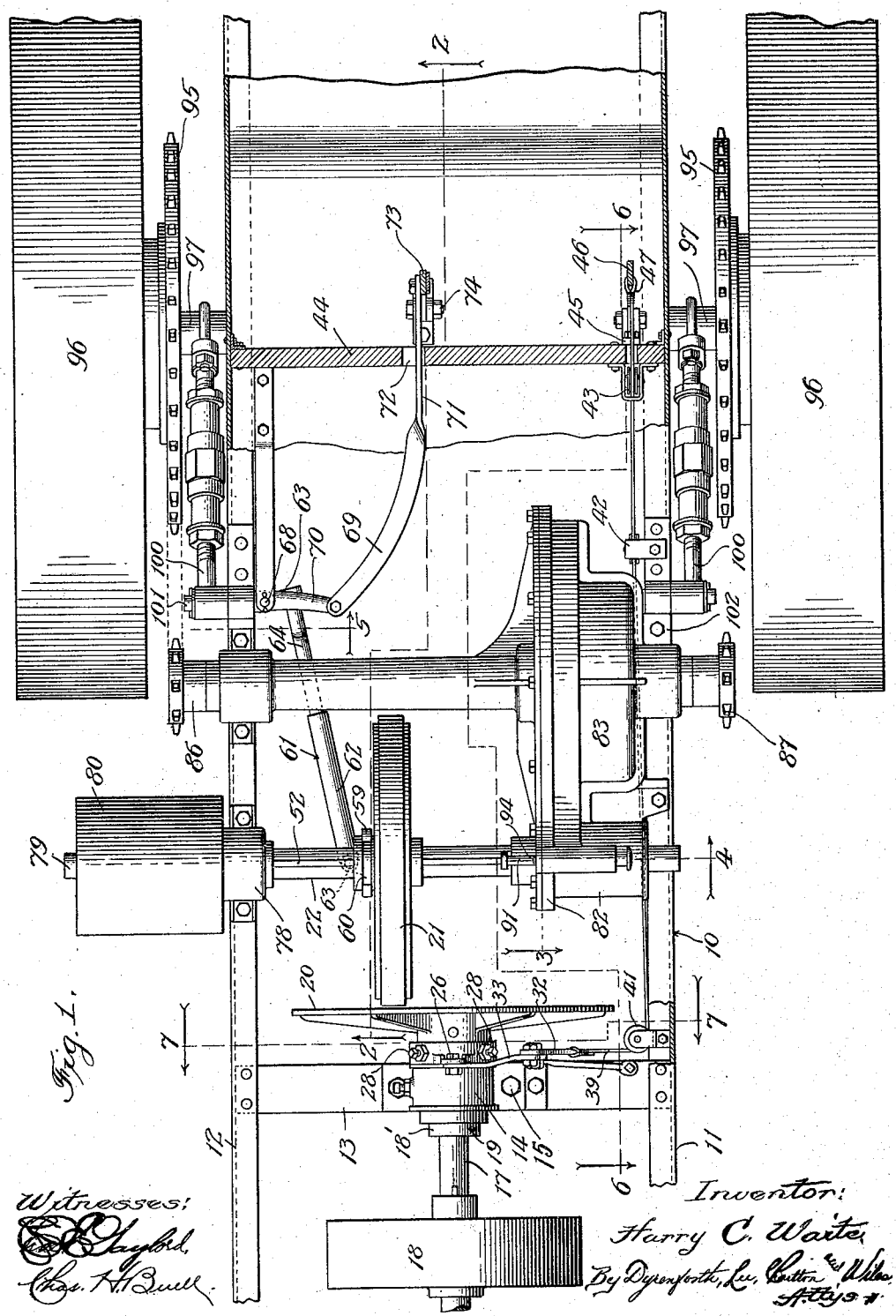

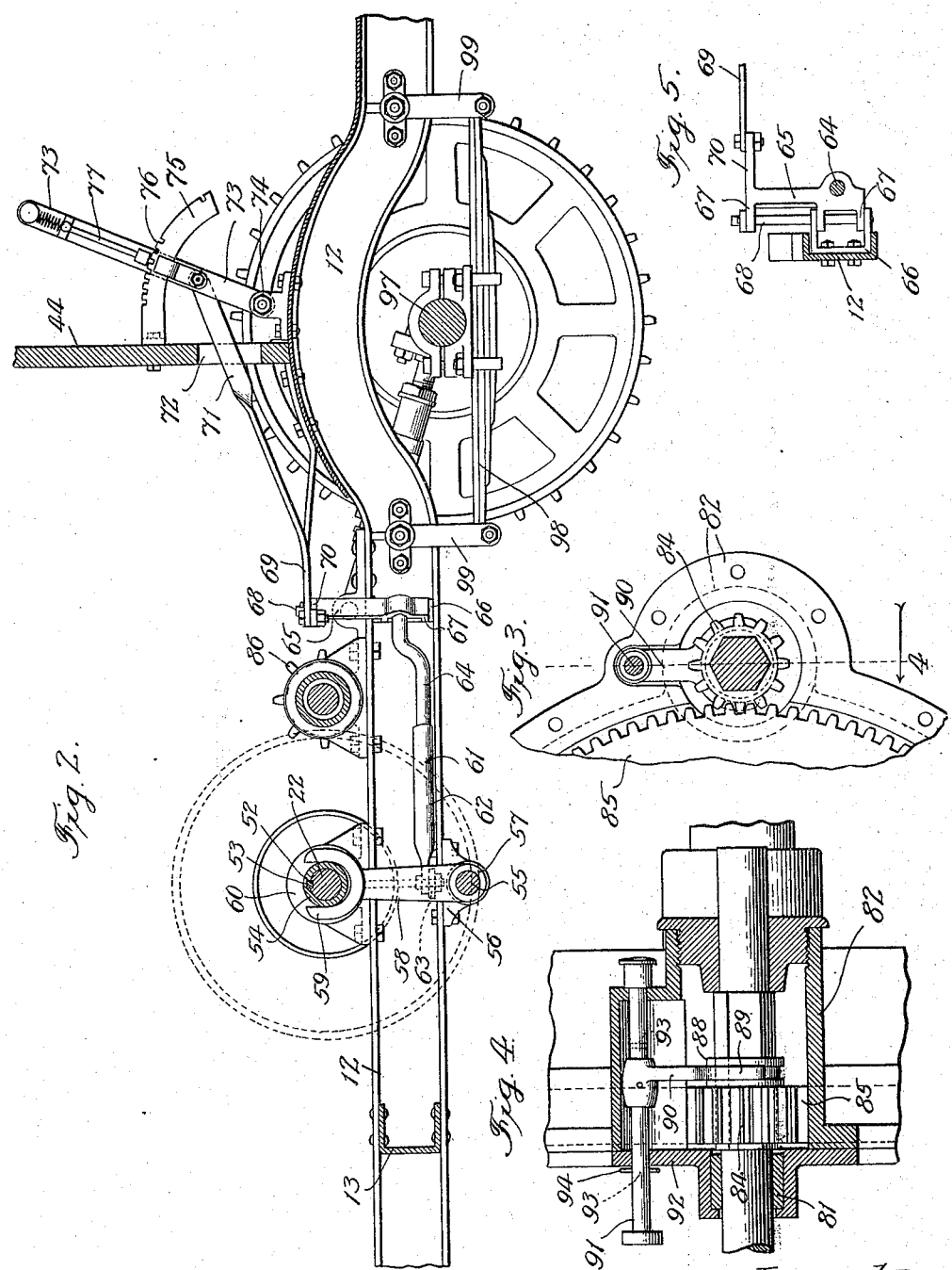

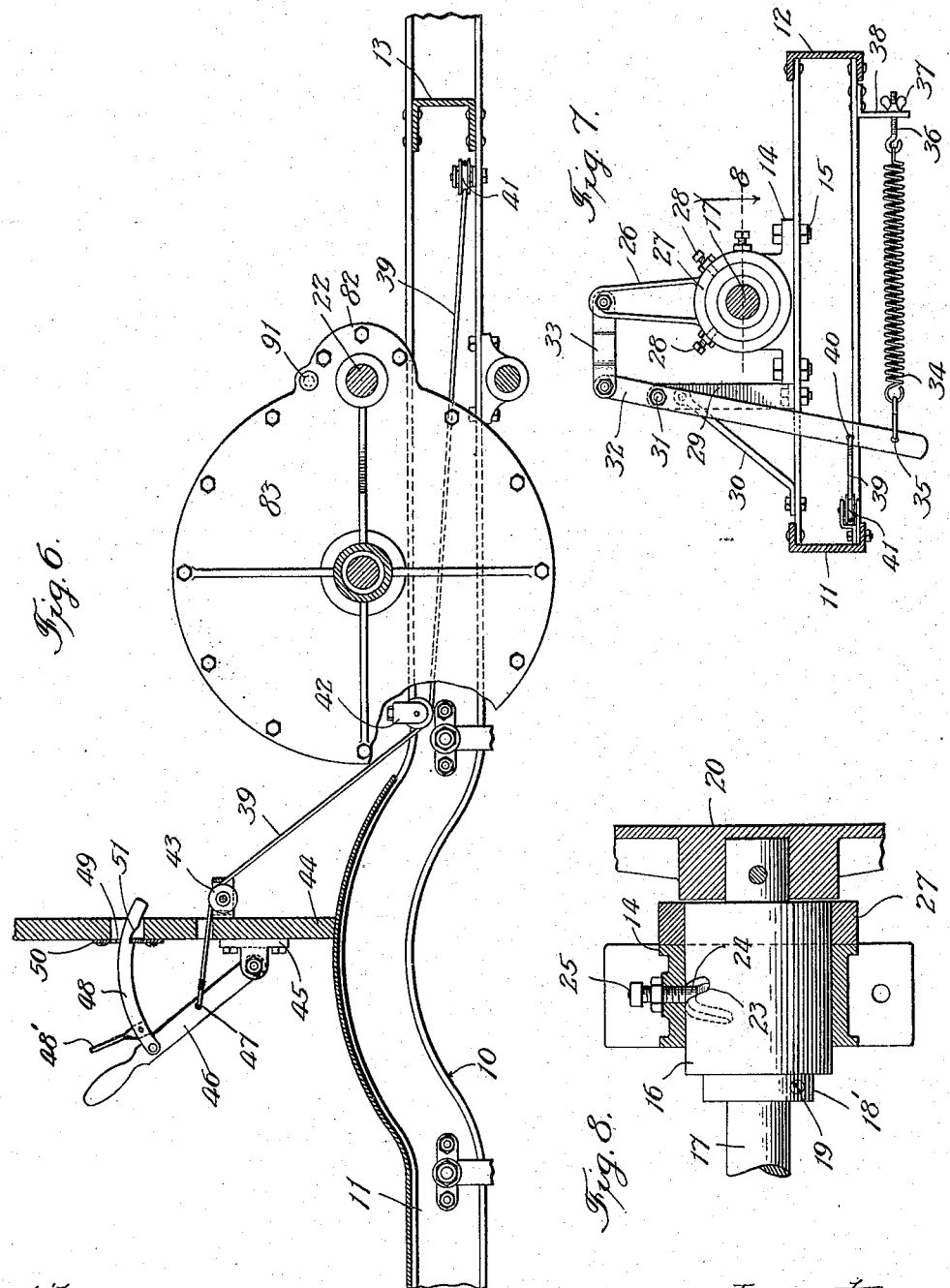

UNITED STATES PATENT OFFICE.

HARRY C. WAITE, OF CHICAGO, ILLINOIS, ASSIGNOR TO WAITE TRACTOR COMPANY, OF CHICAGO, ILLINOIS, A CORPORATION OF ILLINOIS.

TRACTOR.

1,191,858.      Specification of Letters Patent.      Patented July 18, 1916.

Application filed January 9, 1915. Serial No. 1,284.

*To all whom it may concern:*

Be it known that I, HARRY C. WAITE, a citizen of the United States, residing at West Pullman, Chicago, in the county of Cook and State of Illinois, have invented a new and useful Improvement in Tractors, of which the following is a specification.

My invention relates to improvements in tractors, and more particularly to an arrangement of the driving and controlling mechanism of such a machine.

The object of the invention is to provide a design of tractor driving gear and control therefor which will be peculiarly fitted to perform the great variety of work demanded of an agricultural tractor.

Further objects and advantages of the invention will be more fully brought out in connection with the following detailed description of one form of tractor driving and controlling gear constructed in accordance with my invention. In this description reference will be had to the accompanying drawings in which—

Figure 1 is a plan view of the central rear portion of the chassis of a tractor and showing the driving and controlling gear. Fig. 2 is a section on line 2—2 of Fig. 1. Fig. 3 is an enlarged detail section through the differential housing and driving gear taken on the line 3 of Fig. 1. Fig. 4 is an enlarged detail section of the gear-shift mechanism taken on the line 4 of Fig. 3. Fig. 5 is an enlarged section through one of the side frame members and showing the manner in which the friction-drum shift-lever is mounted thereon, substantially on the line 5 of Fig. 1. Fig. 6 is a longitudinal section through the frame taken on the line 6 of Fig. 1. Fig. 7 is a section through the drive-shaft and showing the friction-disk controlling means taken on the line 7 of Fig. 1, and Fig. 8 is an enlarged detail section taken on the line 8 of Fig. 7.

Referring more particularly to the drawings, the numeral 10 indicates the chassis frame of the tractor, this frame being made up of side or longitudinal channel sections 11 and 12 connected by transverse members at their ends, not shown, and by an intermediate transverse channel-section 13. The transverse frame member 13 carries centrally thereof a journal casting 14 bolted to the frame member as shown at 15, and supporting a journal bushing 16, which serves as a bearing for a drive-shaft 17. In the drawings, the drive-shaft 17 is shown as being connected to a fly-wheel 18 which, in common practice, will form part of a gasolene engine, although it will be understood that any preferred means may be used for driving the shaft 17. At the inner end of the journal bushing 16 the shaft 17 is provided with a thrust-collar $18^1$ clamped around the shaft as by a screw 19, and the outer end of the drive-shaft has pinned or keyed thereto a friction-disk 20 which is adapted to drive a friction-drum 21 mounted upon a counter-shaft 22. In order to advance and retract the friction-disk and thereby control its driving engagement with the drum 21, the journal bushing 16 is provided with a helical groove 23 (see Fig. 8), in which rides the end 24 of a belt 25 which is tapped into the wall of the journal casting 14 so that as the bushing 16 is rotated it will move axially and thereby shift the shaft 17 and the connected friction-disk 20 toward and away from the friction-drum. In order to effect this required rotation of the bushing 16 I provide an arm 26 having a collar 27 at its lower end which may be fastened to the bushing as by set-screws 28 (see Fig. 7). A bracket 29, which is braced by an inclined strut 30, carries at its upper end a pivot bolt 31 on which swings a lever 32. The upper end of the lever 32 is connected by a link 33 with the arm 26, and the lower end of the lever is urged transversely of the frame by a tension spring 34 stretched between an eye 35 in the end of the lever and an adjusting bolt 36, the winged adjusting nut 37 of which is held by a bracket 38 adjacent the outer frame member 12. The tendency of the spring 34 is to cause the arm 26 to rotate in a counter-clockwise direction, as viewed in Fig. 7, and thereby to rotate the bushing 16 in the direction indicated by the arrow in Fig. 8, whereby the friction-disk 20 is constantly urged outward into contact with the friction-drum 21 by the force of this spring.

It will further be noted that the arrangement of the parts is such that the pressure of frictional engagement between the friction-disk and the drum may be most conveniently adjusted by means of the winged nut 37 which lies on the side of the tractor and just below the frame member 12 thereof.

In order to retract the friction-disk from its driving engagement with the friction-drum, I provide a cable 39 which is connected to an eye 40 in the arm 32 and passes thence over a guiding pulley 41 carried by the frame member 11, thence rearwardly along the frame through a second guiding pulley 42 (see Fig. 6), thence upwardly and rearwardly and over a pulley 43 mounted on the vertical wooden control-board 44 which is carried by the rearwardly extending ends of the frame members 11 and 12. On the rear face of the control-board 44 is mounted a base-block 45 in which is pivoted a clutch lever 46, an eye 47 in the clutch-lever serving as an attaching means for the end of the cable 39. An arcuate arm 48 pivoted to the lever 46 near its upper end, is adapted to slide through a slot 49 in a locking plate 50 which is screwed to the outer face of the board 44. The arm 48 has milled in its lower edge, adjacent the free end, a notch 51 which is adapted to engage over the locking plate 50, as shown in Fig. 6, and in this position of the parts the cable 39 will be under the tension of the spring 34, the arm 26 having been rotated in a clockwise direction from the position shown in Fig. 7 so as to retract the drive-shaft 17 and release the friction-disk from its engagement with the drum. When it is desired to effect driving engagement between the disk and drum a handle 48¹ on the latch arm 48 may be operated to free the end of the arm from its engagement with the plate 50, and the spring 34 will then act to swing the lever 26 back to the position shown in Fig. 7, and to swing the clutch control lever 46 up against the face of the board 44.

Referring again to Fig. 1, it will be seen that the counter-shaft 22 carries a spline or feather 52 which engages a key-way 53 in the hub 54 of the friction-drum 21 (see Fig. 2). By means of this well-known spline connection the friction-drum 21 may slide longitudinally of the counter-shaft 22, and to provide means for sliding the drum I mount below the counter-shaft and parallel thereto, a transverse bar 55 (see Fig. 2), carried at its ends by brackets 56 riveted to the lower faces of the channel members 11 and 12. A hub-boss 57 which is slidable along the bar 55 carries a vertically extending arm 58, the bifurcated end 59 of which engages a channel 60 in the hub 54 of the friction-drum. In order to shift the arm 58 I connect thereto a telescopic lever, indicated as a whole by 61, and consisting of an outer tubular member 62 which is pivoted to a lug on the side of the arm 58, as shown at 63, and a telescoping rod 64 the outer end of which slides within the bore of the tubular member 62, and the inner end of which is mounted in a swinging knuckle 65 carried by a U-shaped bracket 66 bolted to the channel member 12 (see Fig. 5). The knuckle 65 carries outstanding lugs 67 which receive a vertical pivot bolt 68. For operating the knuckle 65 I provide a link 69, the forward end of which is pivoted to an arm 70 on the knuckle, and the rear end 71 of which passes through a slot 72 in the board 44 and is connected to a shift-lever 73 which swings about a pivot 74 carried by the channel member 12. A quadrant 75 bolted to the rear face of the board 44 has a notched periphery 76 with which engages a spring-pressed latch-rod 77 on the shift-lever 73 so that the lever may be held in any adjusted position.

By means of the connections above described, the shift-lever 73 may be operated to swing the knuckle 65 and, through it the arm 61, to shift the friction-drum 21 across the face of the friction-disk 20. As is well understood, the velocity ratio of the driving shaft 17 and the counter-shaft 22 may thereby be altered, and if the friction-drum be swung past the center of the disk the rotation of the counter-shaft may be reversed.

Referring again to Fig. 1, it will be seen that the counter-shaft 22 is journaled at one end in a bearing 78 bolted to the upper face of the channel section 12. This end of the counter-shaft projects through the bearing 78, and the projecting end, indicated by 79, has mounted thereon a belt pulley 80. The opposite end of the counter-shaft is journaled in bushings 81 which are mounted in a casting 82 which is formed integrally with the differential housing 83, that portion of the counter-shaft which lies within the casting 82 being of hexagonal section, as indicated in Fig. 3, and carrying a driving pinion 84 which is adapted to mesh with a driving gear 85. The driving gear 85 is mounted upon some suitable form of differential gearing contained within the housing 83 and connected with shafts which carry sprockets 86—87 at their outer ends, the entire assembly, commonly referred to as a jack-shaft, being mounted transversely of the frame and parallel to the counter-shaft 22. The construction and operation of such jack-shafts is well known, and therefore I do not deem it necessary to illustrate the details of construction of my jack-shaft.

Referring to Fig. 4 it will be seen that the pinion 84 has an extended hub 88 which is grooved or channeled to receive the bifurcated end 89 of a shifter-rod 90 which is mounted upon a sliding shaft 91 carried by an offset portion 92 of the housing 82. The shaft 91 has enlarged heads on each of its outwardly extending ends, and intermediate its length is provided with cotter-pin holes 93, the holes being so positioned that a cotter-pin 94 may be inserted in one of the holes to lock the shaft in either of its two positions. In the position shown in Fig. 4 the pinion 84 is in mesh with the gear 85. If the cotter-pin 94 be withdrawn and the shaft moved to the right until stopped by the head, the driving pinion 84 will slide longitudinally of the counter-shaft to a position in which it is free of the gear 85. The slide-shaft 91 may then be secured in this position by inserting a cotter-pin in the other hole 93.

The jack-shaft sprockets 86—87 are adapted to be connected by suitable driving chains, not shown, with driving sprockets 95 carried by the drive-wheels 96 of the tractor. These wheels are mounted upon a solid axle 97 (see Fig. 2) which is carried by underslung leaf-springs 98, the shackles 99 of which are secured to the frame members 11 and 12. Preferably, these frame members will be bowed upwardly at a point above the axle 97 to increase the clearance and permit greater spring action. Since the springs 98 are shackled at both ends the tractive effort or push of the axle 97 must be transferred to the frame through some connections other than the springs. To accomplish this purpose I have shown radius rods 100 which will preferably be adjustable in length in order to maintain proper alinement of the axle and to take up slight looseness of the chains. These radius rods I have shown as pivoted to studs 101 carried by brackets 102 mounted upon the upper face of the channel sections 11 and 12.

In the operation of my tractor as a vehicle for pulling agricultural machinery, or for similar service, the motor which supplies power to the drive-shaft 17 may be operated at a constant speed, and the tractor will then be controlled by means of the shift-lever 73 and the clutch lever 46. It should be particularly noted, in connection with this clutch lever, that the connections are such that the clutch may readily be controlled either from the tractor itself or from any point behind the tractor, as, for instance, from the platform of a binder, thresher, or other machine requiring the attendance of an operator. Thus if the latch arm 48 be rendered inoperative, as by tying the handle 48¹ to the clutch lever, a rope or cable may be fastened to the clutch lever and extended rearwardly to any point from which it is desired to control the operation of the tractor, and by simply pulling or releasing such extension cable the friction-disk may be withdrawn from or permitted to engage the friction drum 21, whereby the tractor may be stopped and started. For adjusting the speed, tractive effort, or direction of movement of the tractor the shift lever 73 may be operated to slide the friction-drum across the face of the disk, thereby varying the relative speed and torque and direction of rotation of the drive-shaft 17 and the counter-shaft 22.

In making use of my tractor as a portable power plant for operating saw mills, threshers, or other machinery, the tractor will be brought into the proper position, and the slide-shaft 91 then operated to shift the pinion 84 out of engagement with the driving gear 85. By this simple means the counter-shaft is disconnected from the jack-shaft, and the pulley 80 may be belted to drive any form of machinery, as desired. In such use of the tractor the shift-lever 73 and the clutch lever 46 may be operated in precisely the same manner to determine the torque, speed and direction of rotation of the pulley 80, and hence of the machine which is being driven. The clutch connections are particularly advantageous for this use of the machine since the tractor motor itself will operate continuously for long periods of time without attention, and by extending a suitable cable connection from the clutch lever 46 to the machine which is being driven, the attendant of this machine may readily control the stopping and starting of the counter-shaft.

While I have shown and described in considerable detail one design of tractor driving and controlling mechanism embodying my invention, it will be understood that my invention is not to be regarded as limited to the details of construction shown and described, except in so far as I have included such limitations within the terms of the following claims in which it is my intention to claim all novelty inherent in my invention as broadly as is permissible in view of the prior art.

What I claim as new and desire to secure by Letters Patent is:—

1. In a tractor, a frame, a drive-shaft mounted longitudinally of the frame, a counter-shaft mounted transversely of the frame, variable speed driving and clutch connections between the drive-shaft and the counter-shaft, a jack-shaft beyond the drive shaft and parallel with the counter-shaft, driving connections between the counter-shaft and the jack-shaft, means for releasing said driving connections to permit independent rotation of the counter-shaft whereby the latter may be used for driving independent mechanism, an axle beyond the jack shaft, drive-wheels mounted on the axle, and driving connections between said jack-shaft and said wheels.

2. In a tractor, a frame, a drive-shaft mounted longitudinally thereof, a friction-disk carried by the end of the drive-shaft, a counter-shaft mounted transversely of the frame, a friction-drum carried by the counter-shaft and adapted to be engaged by the said disk, means for controlling the engagement of the disk and drum, a jack-shaft beyond the drive shaft and parallel to the counter-shaft, driving connections between the counter-shaft and the jack-shaft, means for releasing said connections, whereby the counter-shaft may rotate independently of the jack-shaft to drive independent mechanism, an axle beyond the jack shaft, drive-wheels mounted on said axle, and driving connections between said wheels and said jack-shaft.

3. In a tractor, a frame, a drive-shaft mounted longitudinally thereof, a friction-disk carried by the end of the drive-shaft, a counter-shaft mounted transversely of the frame and having one end extending beyond the same, whereby external driving connections may be applied to said counter-shaft, a friction-drum mounted on said counter-shaft in operative relation to said disk, means for shifting the disk toward and away from the drum, means for shifting the drum across the face of the disk, a jack-shaft mounted parallel to the counter-shaft, a driving gear mounted on said jack-shaft, a driving pinion mounted on said counter-shaft and meshing with the said driving gear, means for moving said pinion and gear out of mesh with one another, an axle, drive-wheels mounted on said axle, and driving connections between said wheels and said jack-shaft.

4. In a tractor, a frame, a drive-shaft mounted longitudinally of the frame, a friction-disk carried by the end of the drive-shaft, a rotatable collar, connections between said collar and shaft whereby rotation of the collar advances and retracts the shaft, an operating-arm secured to said collar and extending upwardly therefrom, a lever mounted parallel to said operating arm and pivoted to said frame intermediate is ends, a link connecting the upper ends of said lever and arm, a tension-spring secured to the lower end of said lever and extending transversely of the frame and beneath the said shaft, securing and adjusting means mounted on said frame member and connected with the other end of said spring, an operating cable attached to said lever and adapted to move the latter against the tension of the spring, drive-wheels, and drive-connections between said friction-disk and said drive-wheels.

HARRY C. WAITE.

In the presence of—
L. HEISLER,
F. M. RONDEAU.

Copies of this patent may be obtained for five cents each, by addressing the "Commissioner of Patents, Washington, D. C."